(12) United States Patent
Natanzon et al.

(10) Patent No.: US 10,025,931 B1
(45) Date of Patent: Jul. 17, 2018

(54) METHOD AND SYSTEM FOR MALWARE DETECTION

(71) Applicant: EMC Corporation, Hopkinton, MA (US)

(72) Inventors: Assaf Natanzon, Tel Aviv (IL); Philip Derbeko, Modiin (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 265 days.

(21) Appl. No.: 14/984,317

(22) Filed: Dec. 30, 2015

(51) Int. Cl.
*G06F 21/00* (2013.01)
*G06F 21/56* (2013.01)
*G06F 21/78* (2013.01)

(52) U.S. Cl.
CPC .......... *G06F 21/567* (2013.01); *G06F 21/78* (2013.01); *G06F 2221/034* (2013.01)

(58) Field of Classification Search
CPC ... G06F 21/567; G06F 21/78; G06F 2221/034
See application file for complete search history.

(56) References Cited

U.S. PATENT DOCUMENTS

| 9,672,355 | B2 * | 6/2017 | Titonis | G06F 21/56 |
| 9,697,355 | B1 * | 7/2017 | Park | G06F 21/552 |
| 2013/0097706 | A1 * | 4/2013 | Titonis | G06F 21/56 726/24 |
| 2014/0359302 | A1 * | 12/2014 | Joshi | G06F 12/1408 713/189 |

* cited by examiner

*Primary Examiner* — Mahfuzur Rahman
(74) *Attorney, Agent, or Firm* — Krishnendu Gupta

(57) ABSTRACT

Example embodiments of the present invention relate to methods, systems, and a computer program product for detecting and responding to the presence of persistently executing malware. The method includes receiving a host-level I/O log and receiving a storage-level I/O log. An analysis may be performed on the host-level I/O log and the storage-level I/O log and evidence of malware may be detected according thereto.

18 Claims, 5 Drawing Sheets

METHOD AND SYSTEM FOR MALWARE DETECTION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATION

This Application is related to U.S. patent application Ser. No. 14/755,517 entitled "METHOD AND SYSTEM FOR MALWARE DETECTION IN VIRTUAL MACHINES" filed on Jun. 30, 2015 the teachings of which applications are hereby incorporated herein by reference in their entirety.

TECHNICAL FIELD

This application relates to malware detection.

BACKGROUND

Generally, malicious software of "malware" includes so-called Advanced Persistent Threats (APTs) may be characterized by persistent, background execution with a purpose of stealing sensitive information and/or obtaining unauthorized access to computing resources. Typically, detecting APTs and taking remediation actions may be difficult. Traditionally, anti-malware products, including anti-virus applications, may depend on file signatures for detection of malware. Typically, signatures of executable files of known malware may be stored in a database, and detection products may scan a target system for files having matching signatures. Such detection techniques may be thwarted by creating variants that have a same or similar functionality but different signatures, a technique which is used to some degree by fraudsters. These detection techniques may also be thwarted by malware that actively seeks to avoid detection by disabling anti-virus software, embedding itself into an operating system kernel, and other methods.

SUMMARY

Example embodiments of the present invention relate to methods, systems, and a computer program product for detecting and responding to the presence of persistently executing malware. The method includes receiving a host-level I/O log and receiving a storage-level I/O log. An analysis may be performed on the host-level I/O log and the storage-level I/O log and evidence of malware may be detected according thereto.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
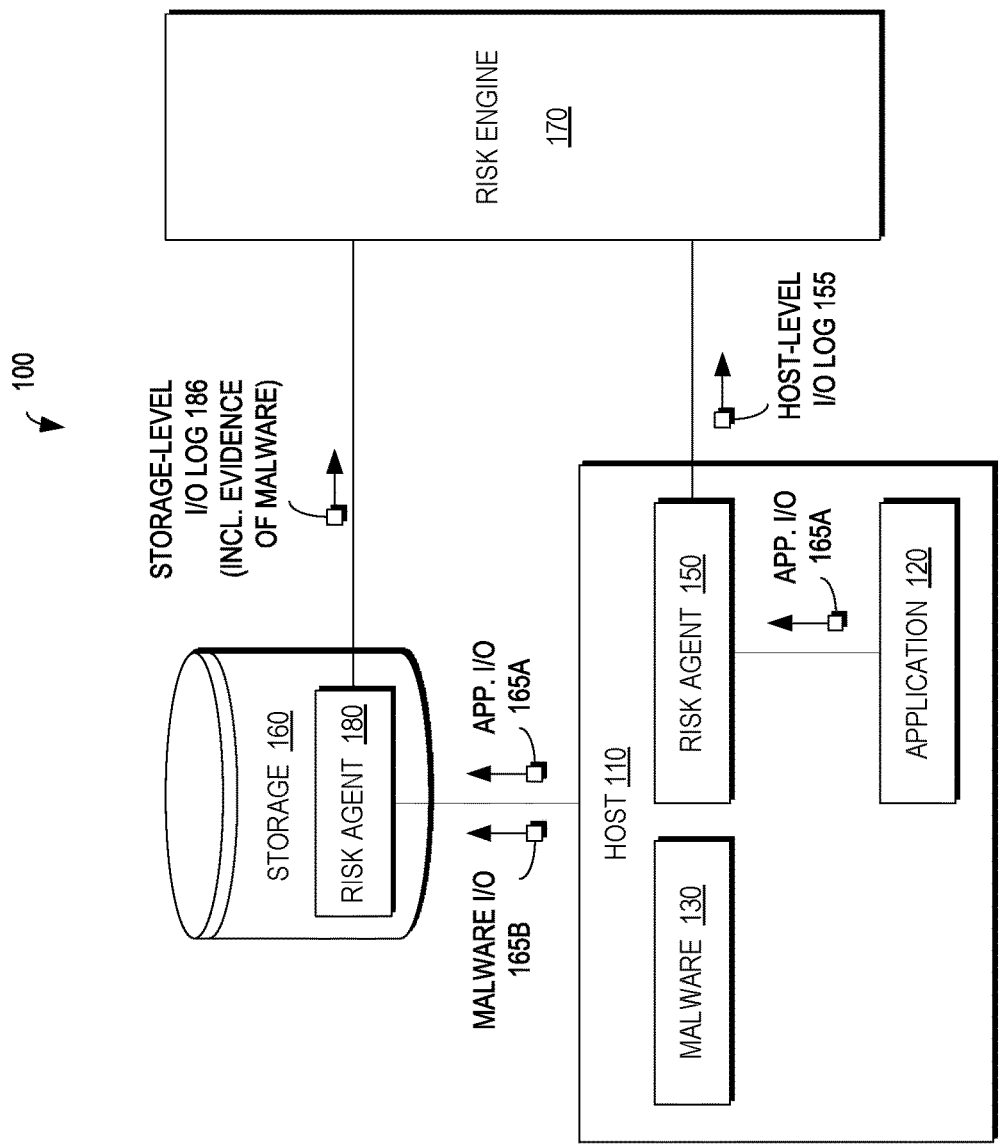
FIG. 1 is a block diagram illustrating a system for detecting evidence of malware according to an example embodiment of the present invention.

FIG. 1 is a block diagram of a system 100 according to an example embodiment of the present invention. As illustrated in FIG. 1, the system 100 includes a host 110, a storage system 160, and a risk engine 170. The host 110 comprises an application 120 and a risk agent 150. The storage system 160 also has an associated risk agent 180 which, as illustrated in FIG. 1, operated in the storage system 160 but, in alternate embodiments, may exist outside the storage system 160 in the data path from the host 110 to the storage system 160. The risk agents 150, 180 are communicatively coupled to the risk engine 170 which, as will be described in greater detail below, may be configured to perform analysis on metadata received from the risk agents 150, 180 and detect presence of malware 130 based on the analysis performed.

As illustrated in FIG. 1, the application 120 may generate an I/O 165A at times the application 120 is executing/running at the host 110. The application I/O 165A may be transmitted from the host 110 to the storage system 160 and be monitored by the risk agent 150 at the host level. Log entries are created for the application I/O 165A at the host level, referred to as host-level I/O logs 155. For the application I/O 165A transmitted to the storage system 160, the risk agent 180 at the storage system 160 also creates log entries at the storage level, referred to as the storage-level I/O log 186. The host-level I/O log 155 is transmitted from the host risk agent 150 to the risk engine 170; likewise, the storage-level I/O log 186 is transmitted from storage risk agent 180 to risk engine 170.

In certain embodiments, malware 130 may attack the host 110 or be present/residing in the host 110 in a dormant state and get active at some point in time that may result in malfunctioning or destruction of the system 100. In some embodiments, malware may generate its own I/O 165B in the host 110. In other embodiments, malware may interact with the application 120 and modify the application I/O 165A, such that the modified application I/O may be treated as a malware I/O 165B. The malware I/O 165B is also transmitted from the host 110 to the storage system 160. In many embodiments the malware 130 may alter the I/O path so that I/Os generated by the malware 130 may be hidden from the standard I/O stack of the host 110 and thus not intercepted by the host risk agent 150 (i.e., an I/O stack filter drivers).

In one embodiment, malware 130, also referred to as malicious software, may be any software used to disrupt computer operations, gather sensitive information, or gain access to private computer systems (e.g., host 110). In a further embodiment, malware 130 is defined by its malicious intent, acting against the requirements of the computer user, and does not include software that causes unintentional harm due to some deficiency. In a further embodiment, malware 130 may be intended to steal information or spy on computer users for an extended period without their knowledge, or it may be designed to cause harm, often as or to extort payment.

As illustrated in FIG. 1, the risk engine 170 is configured to detect the presence of malware 130 in the host 110. The risk engine 170 is configured to receive a host-level I/O log 155 and a storage-level I/O log 186. host-level I/O logstorage-level I/O log The risk engine 170 is also configured to perform an analysis on the received host-level I/O log 155 and a storage-level I/O log 186. According to the analysis performed on the host-level I/O log 155 and the storage-level I/O log 186 at the risk engine 170, the risk engine 170 may detect evidence of the presence of malware 130. For example, in one instance, a malware I/O 165B may not have any log entries in the host-level I/O log 155, but be recorded in the storage-level I/O log 186, such that the risk engine 170 may find a difference between the host-level I/O log 155 and the storage-level I/O log 186, thereby providing evidence of the presence of malware 130.

The risk engine 170 assists the host 110 (or a datacenter administrator in which the host 110 operates) in detecting evidence of the presence of potentially harmful malware that may be executing in the host 110. This detection is performed in part by detecting differences in I/O metadata at different points in the data path. During operation, the host risk agent 150 and the storage risk agent 180 gather log data and provide the log data to the risk engine 170 to invoke an analysis of the logged I/O metadata. In one embodiment, if evidence of malware is detected, then a control action may be taken to address the threat posed by the malware, which may include notifying a human system operator or taking some automatic action.

Although FIG. 1 shows direct connections between the risk agent 150, the risk agent 180, and the risk engine 170, it will be appreciated that communications between these components passes through physical computing hardware, similar to communications between the application 120 and other external computers or devices. In certain embodiments, data logged by risk agents 150, 180 may include I/O metadata relating to one or more of timestamp, I/O type (e.g., read, write), start address, offset, and length. In certain other embodiments, elements of I/O metadata from each of the host level I/O log 155 and the storage-level I/O log 186 may be compared by the risk engine 170 to look for evidence of malware 130 operating at the host 110.

In certain embodiments, one or both of the risk agents 150, 180 may be a splitter. In one embodiment, the storage risk agent 180 may be placed in the storage system 160. In a further embodiment, the storage risk agent 180 may be placed anywhere in the data path between the host 110 and the storage system 160. In an example embodiment, the risk agents 150, 180 may preferably be EMC RecoverPoint® splitters by EMC Corporation of Hopkinton, Mass. In a further embodiment, each splitter may be an agent running on a production host, a switch, or a storage array that may be configured to intercept I/O and split them to a data protection appliance (such as EMC RecoverPoint by EMC Corporation of Hopkinton, Mass.) and to a storage system 160, fail I/O, redirect I/O, or do any other manipulation to the I/O. In certain other embodiments, a risk engine 170 may be a data protection appliance (such as EMC RecoverPoint by EMC Corporation of Hopkinton, Mass.), which may be a computer or a cluster of computers (i.e., a physical device), or a set of processes (i.e., a virtual device or a combination of virtual and physical devices) that serve as a data protection appliance, responsible for data protection services including, inter alia, data replication of a storage system, and journaling I/O requests issued by a host computer 110 to the storage system 160.

A discussion of mirroring may be found in U.S. Pat. No. 7,346,805 entitled "PROTECTION OF MIRRORED DATA" issued on Mar. 18, 2008, a discussion of journaling and some techniques associated with journaling may be found in U.S. Pat. No. 7,516,287 entitled "METHODS AND APPARATUS FOR OPTIMAL JOURNALING FOR CONTINUOUS DATA REPLICATION" issued on Apr. 7, 2009, and a discussion of dynamically adding storage for a journal may be found in U.S. Pat. No. 7,840,536 entitled "METHODS AND APPARATUS FOR DYNAMIC JOURNAL EXPANSION" issued on Nov. 23, 2010, all of which are assigned to EMC Corporation of Hopkinton, Mass. and are hereby incorporated by reference in their entirety.

Figure 2:
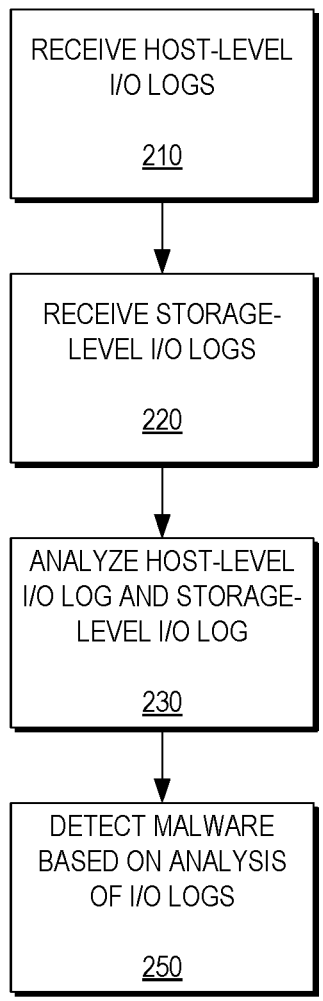
FIG. 2 is a flow diagram illustrating a method for detecting evidence of malware according to an example embodiment of the present invention.

FIG. 2 is a flow diagram 200 illustrating a method for detecting malware according to an example embodiment of the present invention. In example embodiments of the present invention, the method maybe performed at the risk engine (e.g., risk engine 170 of FIG. 1). A host-level I/O log 155 is received at a risk engine 170 from risk agent 150 at the host 110 (210) and a storage-level I/O log 186 is received by the risk engine 170 from the risk agent 180 at the storage system 160 (220). One or more of the host-level I/O log 155 and the storage-level I/O log 186 may include metadata selected from a group consisting of: a timestamp, a I/O type, a start address, an offset, an address, and an I/O length. An analysis then may be performed on the host-level I/O log 155 and the storage-level I/O log 186 (230). Based on the analysis performed on the host-level I/O log 155 and the storage-level I/O log 186, presence of malware may be detected (250). If presence of malware is detected, a user may be notified regarding the detection of the evidence of the presence of malware.

Figure 3:
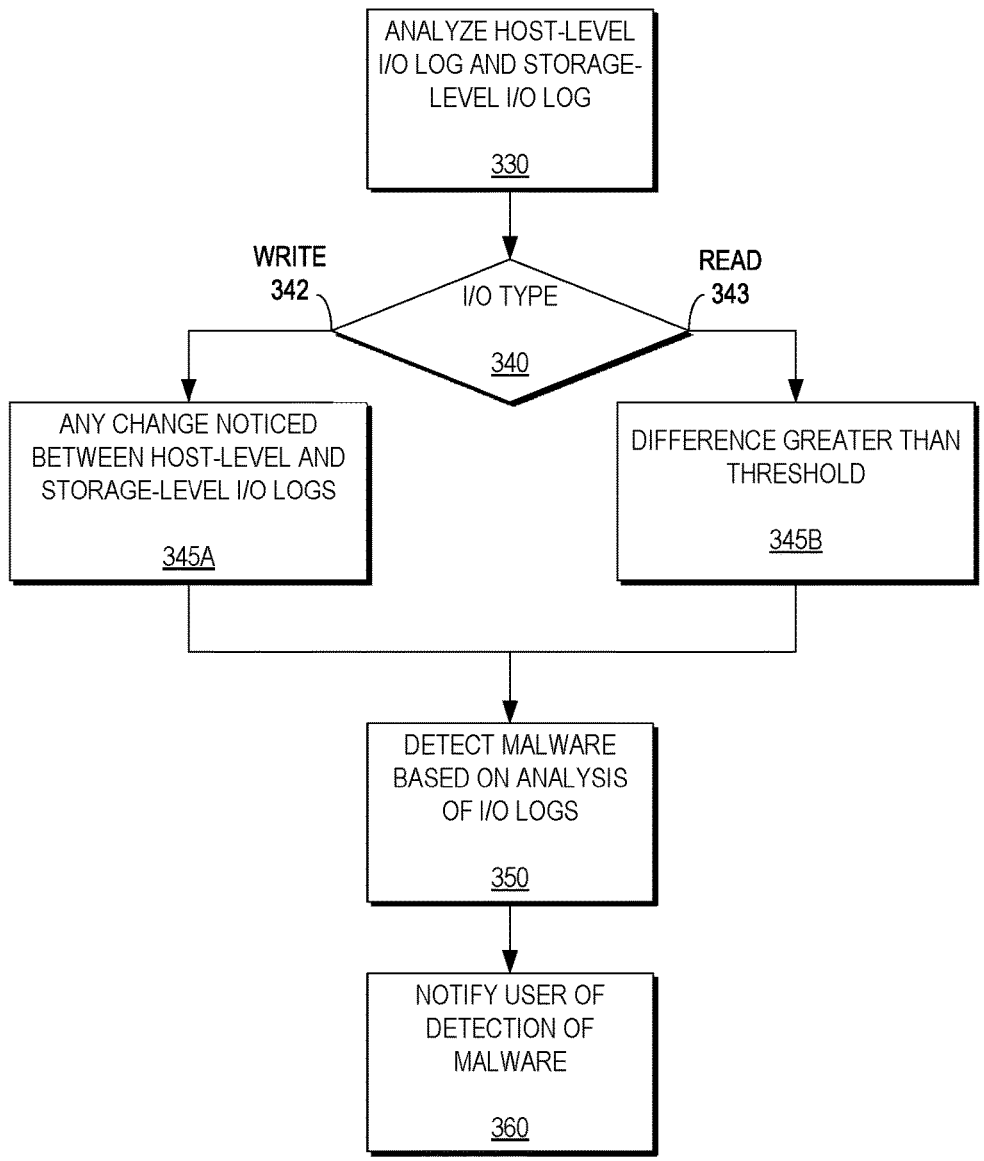
FIG. 3 is a flow diagram illustrating a method for detecting evidence of malware according to read and write I/Os according to an example embodiment of the present invention.
Figure 4:
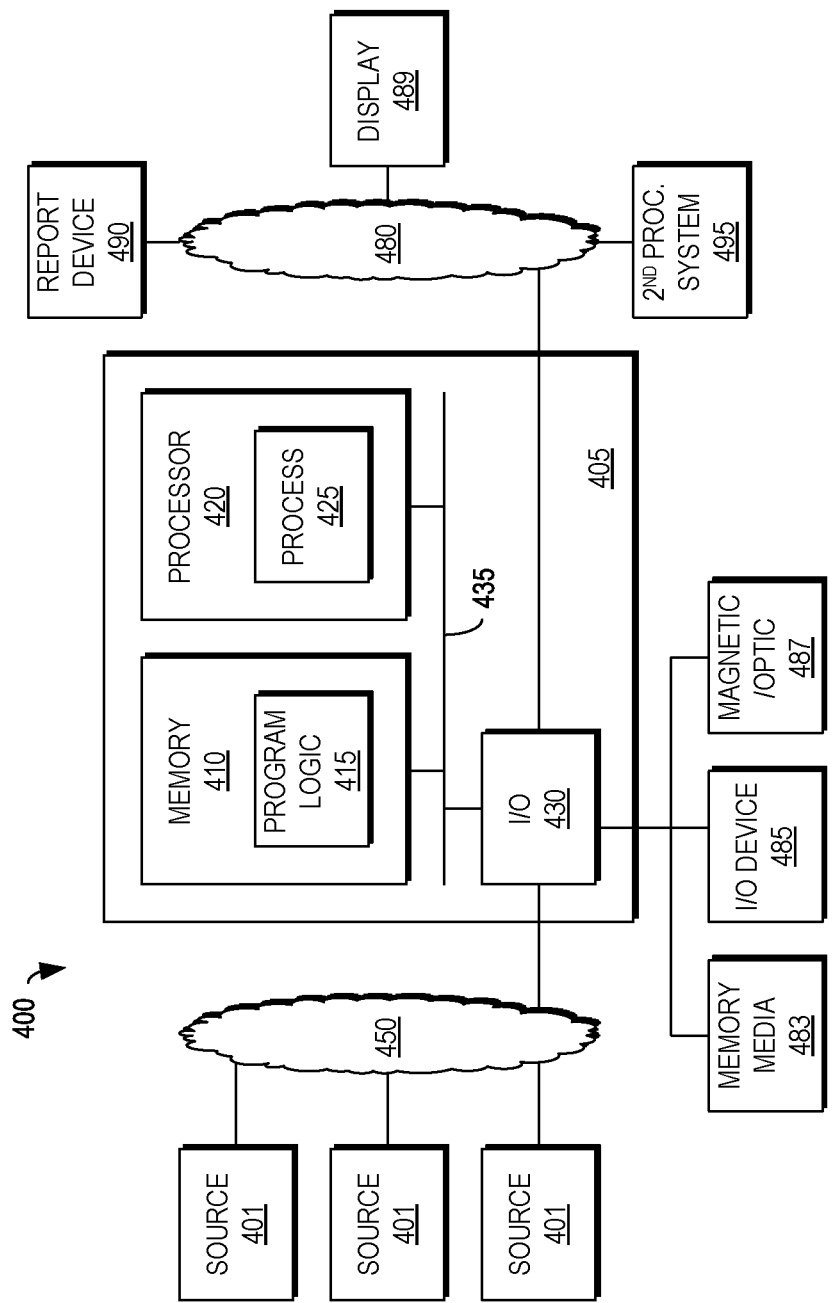
FIG. 4 is a block diagram illustrating an apparatus according to an example embodiment of the present invention.

FIG. 3 is a flow diagram 300 illustrating a method for detecting malware according to an example embodiment of the present invention. Analysis is performed on the host-level I/O log 155 and the storage-level I/O log 186 (330). A determination then may be made as to whether, based on the analysis, any unusual aspects are found in the host-level I/O log 155 or the storage-level I/O log 186 according to the logged read I/Os and write I/Os (340). If any unusual aspect found in the log is related to a write I/O (342), it is determined if there is any change between the host-level I/O log 155 and the storage-level I/O log 186 (345A). Alternatively, if the unusual aspect found in the log is related to a read I/O (343), the risk engine 170 determines whether the amount of difference in metadata for read I/Os in the host-level I/O log 155 and the storage-level I/O log 186 is greater than a defined threshold (345B). If any difference is observed involving write I/Os or if an amount of differences between the logs us related to read I/Os then evidence of malware is detected based on the analysis (350). Similar to FIG. 2, if presence of malware is detected, a user may be notified regarding the detection of the evidence of the presence of malware FIG. 4 is a block diagram of an example embodiment apparatus 405 according to the present invention. The apparatus 405 may be part of a system 400 and includes memory 410 storing program logic 415, a processor 420 for executing a process 425 and a communications I/O interface 430, connected via a bus 435. The exemplary apparatus 405 is discussed only for illustrative purpose and should not be construed as a limitation on the embodiments or scope of the present invention. In some cases, some devices may be added to or removed from a computer system based on specific situations. For example, a computer system may be representative of a standalone system or a system of a production site, which comprises a number of hosts coupled to a source disk and a target disk. In most embodiments, a system/device may comprise a processor and a memory, such as a laptop computer, personal digital assistant, or mobile phones.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

In some embodiments, the system may be performed by one or more programmable processors executing one or more computer programs to perform the functions of the system. In some other embodiments, all or part of the system may be implemented as special purpose logic circuitry (e.g., a field-programmable gate array (FPGA) and/or an application-specific integrated circuit (ASIC)). In some other embodiments, all or part of the system may be implemented using electronic hardware circuitry that include electronic devices such as, for example, at least one of a processor, a memory, a programmable logic device or a logic gate.

In one embodiment, the methods described herein are not limited to the specific examples described. In a further embodiment, rather, any of the method steps may be re-ordered, combined or removed, or performed in parallel or in serial, as necessary, to achieve the results set forth above.

In some embodiments, the system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). In certain embodiments, each such program may be implemented in a high level procedural or object-oriented programming language to communicate with a computer system. In certain other embodiments, however, the programs may be implemented in assembly or machine language. In some embodiments, the language may be a compiled or an interpreted language and it may be deployed in any form, including as a stand-alone program or as a module, component, subroutine, or other unit suitable for use in a computing environment. In some other embodiments, a computer program may be deployed to be executed on one computer or on multiple computers at one site or distributed across multiple sites and interconnected by a communication network.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 4, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine. In some other embodiment, a non-transitory machine-readable medium may include but is not limited to a hard drive, compact disc, flash memory, non-volatile memory, volatile memory, magnetic diskette and so forth but does not include a transitory signal per se.

Figure 5:
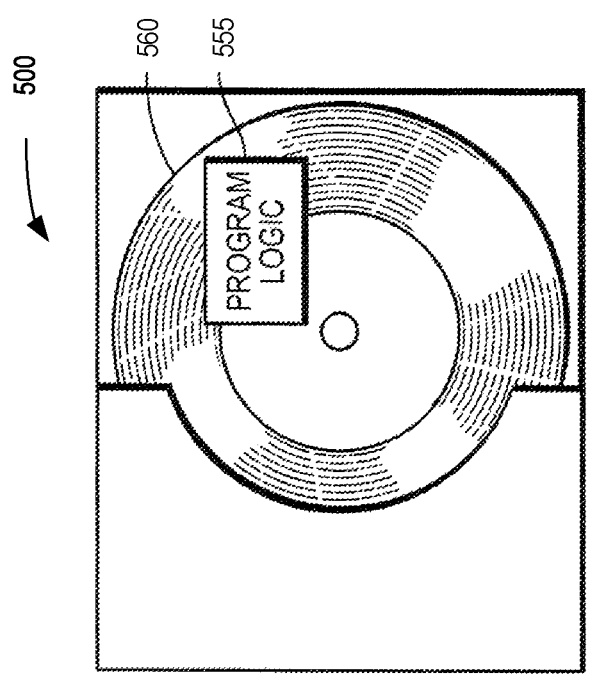
FIG. 5 is an illustrating of an example embodiment of the present invention as embodied in computer program code.

FIG. 5 is a block diagram of a computer program product 500 including program logic 555 encoded on a computer-readable medium 560 in computer-executable code configured for carrying out the methods of the invention, according to an example embodiment of the present invention. The logic for carrying out the method may be embodied as part of the aforementioned system, which is useful for carrying out a method described with reference to embodiments shown. In one embodiment, program logic 555 may be loaded into memory and executed by processor. In a further embodiment, program logic 555 may also be the same program logic 555 on a computer readable medium.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

Herein, various exemplary embodiments of the present invention are described with reference to the accompanying drawings. It should be noted that all of these drawings and description are only presented as exemplary embodiments. It is to be noted that, based on the description, alternative embodiments may be conceived that may have a structure and method disclosed as herein, and such alternative embodiments may be used without departing from the principle of the invention as claimed.

It may be appreciated that these exemplary embodiments are provided only for enabling those skilled in the art to better understand and then further implement the present invention, not intended to limit the scope of the present invention in any manner. Besides, in the drawings, for a purpose of illustration, optional steps, modules, and units are illustrated in dotted-line blocks.

The terms "comprise(s)", "include(s)", their derivatives and like expressions used herein should be understood to be open (i.e., "comprising/including, but not limited to". The term "based on" means "at least in part based on", the term "one embodiment" means "at least one embodiment", and the term "another embodiment" indicates "at least one further embodiment". Relevant definitions of other terms may be provided throughout.

It may be noted that the flowcharts and block diagrams in the figures may illustrate the apparatus, method, as well as architecture, functions and operations executable by a computer program product according to various embodiments of the present invention. In this regard, each block in the flowcharts or block diagrams may represent a module, a program segment, or a part of code, which may contain one or more executable instructions for performing specified logic functions. It should be further noted that, in some alternative implementations, functions indicated in blocks may occur in an order differing from the order as illustrated in the figures. For example, two blocks shown consecutively may be performed in parallel substantially or in an inverse order sometimes, which depends on the functions involved. It should be further noted that each block and a combination of blocks in the block diagrams or flowcharts may be implemented by a dedicated, hardware-based system for performing specified functions or operations or by a combination of dedicated hardware and computer instructions.

What is claimed is:

1. A computer-implemented method for detecting malware on a computing system comprising:
   receiving a host-level I/O (input/output) log on a computing system;
   receiving a storage-level I/O log on the computing system;
   performing an analysis of the host-level I/O log and the storage-level I/O log; and
   detecting evidence of malware according to the analysis of the host-level I/O log and the storage-level I/O log,
   wherein the detecting evidence of malware according to the analysis of the host-level I/O log and the storage-level I/O log comprises detecting evidence of malware operational in a storage host,
   wherein the detecting evidence of malware operational in the storage host comprises detecting differences between the host-level I/O log and the storage-level I/O log,
   wherein the detecting differences between the host-level I/O log and the storage-level I/O log comprises identifying I/O requests logged at the storage-level I/O log and not logged in the host-level I/O log; and
   wherein the identifying I/O requests logged at the storage-level I/O log and not logged in the host-level I/O log comprises, for differences between write I/O requests, detecting any difference between the host-level I/O log and the storage-level I/O log.

2. The method of claim 1
   wherein receiving a host-level I/O log comprises receiving the host-level I/O log from a first splitter operational in a storage host; and
   wherein receiving a storage-level I/O log comprises receiving the storage-level I/O log from a second splitter in a data path from the storage host to a storage device.

3. The method of claim 2 wherein receiving the storage-level I/O log from a second splitter in a data path from the storage host to a storage device comprises receiving the storage-level I/O log from the second splitter operating in a data storage system.

4. The method of claim 1 wherein one or more of receiving a host-level I/O log and receiving a storage-level I/O log comprises:
   receiving metadata for read I/O requests; and
   receiving metadata for write I/O requests.

5. The method of claim 1 wherein one or more of receiving a host-level I/O log and receiving a storage-level I/O log comprises receiving I/O metadata selected from a group consisting of: a timestamp, an I/O type, a start address, an offset, an address, and an I/O length.

6. The method of claim 1 wherein identifying I/O requests logged at the storage-level I/O log and not logged in the host-level I/O log comprises, for differences between read I/O requests, determining whether differences between the host-level I/O log and the storage-level I/O exceed a threshold of acceptable differences between the host-level I/O log and the storage-level I/O log.

7. A computing system for detecting malware comprising:
   one or more processors; and
   memory storing computer program code that when executed on the one or more processors
   causes the system to:
   a first risk agent configured to receive a host-level I/O (input/output) log;
   a second risk agent configured to receive a storage-level I/O log; and
   a risk engine configured to perform an analysis of the host-level I/O log and the storage-level I/O log and detect evidence of malware according to the analysis of the host-level I/O log and the storage-level I/O log,
   wherein the risk engine is further configured to detect evidence of malware operational in a storage host,
   wherein the risk engine is further configured to detect differences between the host-level I/O log and the storage-level I/O log,
   wherein the risk engine is further configured to identify I/O requests logged at the storage-level I/O log and not logged at the host-level I/O log, and
   wherein the risk engine is further configured to, for differences between write I/O requests, detect any difference between the host-level I/O log and the storage-level I/O log.

8. The system of claim 7
   wherein the first risk agent is a first splitter operational in a storage host; and
   wherein the second risk agent is a second splitter in a data path from the storage host to a storage device.

9. The system of claim 8 wherein the second splitter is configured to operate in a data storage system.

10. The system of claim 7 wherein one or more of the first risk agent and the second risk agent is configured to receive metadata for read I/O requests and receive metadata for write I/O requests.

11. The system of claim 7 wherein one or more of the first risk agent and the second risk agent is configured to receive metadata selected from a group consisting of: a timestamp, an I/O type, a start address, an offset, an address, and an I/O length.

12. The system of claim 7 wherein the risk engine is further configured to, for differences between read I/O requests, determining whether differences between the host-level I/O log and the storage-level I/O exceed a threshold of acceptable differences between the host-level I/O log and the storage-level I/O log.

13. A computer program product including a non-transitory computer readable storage medium having computer program code encoded thereon that, when executed by a processor of a computer, causes the computer to detect evidence of malware, comprising:
   computer program code for receiving a host-level I/O (input/output) log;
   computer program code for receiving a storage-level I/O log;
   computer program code for performing an analysis of the host-level I/O log and the storage-level I/O log; and computer program code for detecting evidence of malware according to the analysis of the host-level I/O log and the storage-level I/O log, wherein the computer program code for detecting evidence of malware according to the analysis of the host-level I/O log and the storage-level I/O log comprises detecting evidence of malware operational in a storage host, wherein the computer program code for detecting evidence of malware operational in the storage host comprises detecting differences between the host-level I/O log and the storage-level I/O log, wherein the computer program code for detecting differences between the host-level I/O log and the storage-level I/O log comprises identifying I/O requests logged at the storage-level I/O log and not logged in the host-level I/O log; and wherein the computer program code for identifying I/O requests logged at the storage-level I/O log and not logged in the host-level I/O log comprises, for differences between write I/O requests, detecting any difference between the host-level I/O log and the storage-level I/O log.

14. The computer program product of claim 13 wherein receiving a host-level I/O log comprises receiving the host-level I/O log from a firsts litter operational in a storage host; and wherein receiving a storage-level I/O log comprises receiving the storage-level I/O log from a second splitter in a data path from the storage host to a storage device.

15. The computer program product of claim 14 wherein receiving the storage-level I/O log from a second splitter in a data path from the storage host to a storage device comprises receiving the storage-level I/O log from the second splitter operating in a data storage system.

16. The computer program product of claim 13 wherein one or more of receiving a host-level I/O log and receiving a storage-level I/O log comprises:
    receiving metadata for read I/O requests; and
    receiving metadata for write I/O requests.

17. The computer program product of claim 13 wherein one or more of receiving a host-level I/O log and receiving a storage-level I/O log comprises receiving I/O metadata selected from a group consisting of: a timestamp, an I/O type, a start address, an offset, an address, and an I/O length.

18. The computer program product of claim 13 wherein identifying I/O requests logged at the storage-level I/O log and not logged in the host-level I/O log comprises, for differences between read I/O requests, determining whether differences between the host-level I/O log and the storage-level I/O exceed a threshold of acceptable differences between the host-level I/O log and the storage-level I/O log.

* * * * *